United States Patent [19]

Brigante

[11] 4,148,731
[45] Apr. 10, 1979

[54] MULTI-STAGE APPARATUS FOR THE SEPARATION OF FINELY DIVIDED SOLIDS FROM LIQUIDS

[76] Inventor: Miguel F. Brigante, 4395 E. Tenth La., Hialeah, Fla. 33013

[21] Appl. No.: 864,810

[22] Filed: Dec. 27, 1977

[51] Int. Cl.$^2$ ............................................... B03C 1/30
[52] U.S. Cl. .................................. 210/223; 210/42 S
[58] Field of Search ................. 210/42 S, 222, 223, 210/73 R, 200–202, 53, 252; 209/8, 214

[56] References Cited

U.S. PATENT DOCUMENTS

| | | | |
|---|---|---|---|
| 2,151,261 | 3/1939 | Bartlett | 210/53 |
| 3,121,683 | 2/1964 | Fowler | 210/223 |

FOREIGN PATENT DOCUMENTS

| | | | |
|---|---|---|---|
| 251470 | 5/1963 | Australia | 209/8 |
| 1001119 | 2/1952 | France | 210/222 |
| 408798 | 9/1975 | Spain | 210/223 |
| 510263 | 6/1976 | U.S.S.R. | 210/223 |

Primary Examiner—Benoit Castel
Attorney, Agent, or Firm—Abraham A. Saffitz

[57] ABSTRACT

Apparatus for use in settling or separating finely divided solids, i.e., minerals, from a liquid such as water in which they are suspended. A plurality of settling tanks is provided, each of which is flow connected in series at about the mid-level, which receives processed supernatant fluid in stages. The mineral content of the water in each tank tends to settle by gravity toward the bottom of each tank and is extracted from each tank by extractor pumps. The initial high mineral water is pumped into the first stage tank and is pre-treated by an electromagnet unit surrounding a pipe which contains a helical screw impeller, and each of the succeeding tanks is provided with a pump at about the mid-level and is similarly pre-treated by a similar electromagnetic field and screw impeller in the flow line. Thus, the separation of water containing a high mineral content is affected by gravity and an induced magnetic field impressed by the windings of an electromagnet suspends the particles, and the screw impeller provides a sweeping action to the particles, such that initially processed muddy water is treated in stages to obtain clean water for industrial or home use.

2 Claims, 4 Drawing Figures

MULTI-STAGE APPARATUS FOR THE SEPARATION OF FINELY DIVIDED SOLIDS FROM LIQUIDS

BACKGROUND OF THE INVENTION (a) Field of the Invention

The present invention lies in the general field of liquid purification. The invention also relates to a water clarifying or separating apparatus, and, more particularly, to using a gravity separator for suspended minerals in water which are pre-treated by a magnetic field and by incorporating a helical screw impeller within the magnetic field to provide a sweeping action to the particles in the water prior to settling by gravity. The invention also lies in the field of plural separating tank units which are flow connected in seriatum.

As is well known, water is an essential resource and the supply and/or nature of raw water is frequently contaminated with high mineral content, as, for example, iron oxides. Problems also arise when raw (untreated) water is used directly either in the home, office or industrial facility; it will result in large deposits of scale, corrosion and embrittlement in pipes, boilers and valves.

(b) Brief Description of the Prior Art

The basic concept for settling or separating finely divided solids from a portion of a liquid in which they are suspended is disclosed in U.S. Pat. No. 1,140,131. This patent discloses a metallurgical process using a single vessel and various means for controlling and regulating conditions in the underflow or the overflow, or in both.

U.S. Pat. No. 1,691,060 discloses a method of reclaiming gasoline from sludge by passing sludge and water into a single tank having an overflow, mixing the sludge and water in the tank, settling out the sludge and water, decanting the gasoline, and draining the sludge and water from the tank.

A different construction of the prior art, U.S. Pat. No. 1,458,805, discloses apparatus for the gravity settlement of finely divided solids out of suspension in which the settling area is increased by the introduction of a number of parallel settling surfaces into a single settling tank to secure greater settling capacity in a limited volume.

U.S. Pat. No. 1,754,870 also discloses an apparatus for separating finely divided solids from liquid comprising a single tank, a plurality of superposed bell members therein, and means depending from the bell members to form enlarged annular chambers with the skirts of the superposed bell members.

Yet another prior art device discloses a method and apparatus for separating oil and water by using a plurality of containers, each of which acts as a separator and each of which receives processed fluid by gravity flow from the contaniner immediately preceding it wherein the lighter of the two liquids is allowed to float to the top and the heavier of the liquids successively containing a lesser amount of the lighter material in successive separators is passed to the next separation container. This prior art in contained in U.S. Pat. No. 3,844,944.

OBJECTS OF THE INVENTION

An object of the present invention is to provide an improved apparatus for use in such method whereby to effect the separation of finely divided solids from liquids suspended and dispersed therein in a more efficient manner than heretofore.

A further object of the invention is to provide a plurality of gravity settling tanks which are flow connected in series or stages which has the virtue of simplicity and zero direct running cost.

A further object of the invention is to provide an apparatus for the separation of suspended solids in a liquid which may be greatly facilitated by faster settling of the mineral content by pre-treating the mixture prior to settling by gravity.

Another aim is to effect economical separations on an industrial scale and reduction in the size of settling tanks.

A still further goal is to increase the rate of sedimentation by pre-treating the raw water prior to the first settling stage by inducing an electromagnetic field and sweeping action of the suspended particles in the water and then, likewise, pretreating each succeeding gravity processed water in each stage of clarification and purification.

SUMMARY OF THE INVENTION

This invention provides an apparatus for settling or separating solids such as minerals from raw or hard water of high alkalinity in which they are suspended or dispersed with the object of obtaining clean water. The separation of the initial high mineral content of the water is affected by using a plurality of gravity separators or tanks which are flow connected in series. The flow of the processed water is, in effect, a straight continuous line wherein the flow-line is connected at about the mid-level of each preceding tank and at the top of each succeeding tank. The mineral content of the water in each tank tends to settle by gravity toward the bottom of each tank and is extracted therefrom by extractor pumps. Thus, it is clear that this staging process provides for a higher degree of purification in each succeeding tank.

This invention also provides for pre-treating raw water prior to entering the initial settling tank and also provides for pre-treating the gravity processed water prior to entering each succeeding tank in the purification process for the purpose of increasing the rate of sedimentation. The initial high mineral mixture of water is pumped into the first stage separator tank and is pretreated by inducing an electromagnetic field surrounding a pipe which contains a helical screw impeller that provides a sweeping action on the suspended particles. Each of the succeeding tanks in the downstream flow-line is provided with a pump at about the mid-level for pumping processed water through an electromagnet package unit.

BRIEF DESCRIPTION OF THE DRAWINGS

The invention will be better understood and other objects than those set forth above will become apparent when consideration is given to the following detailed description of a preferred embodiment. Such description makes reference to the annexed drawings wherein.

DETAILED DESCRIPTION OF THE PREFERRED EMBODIMENT

Figure 1:
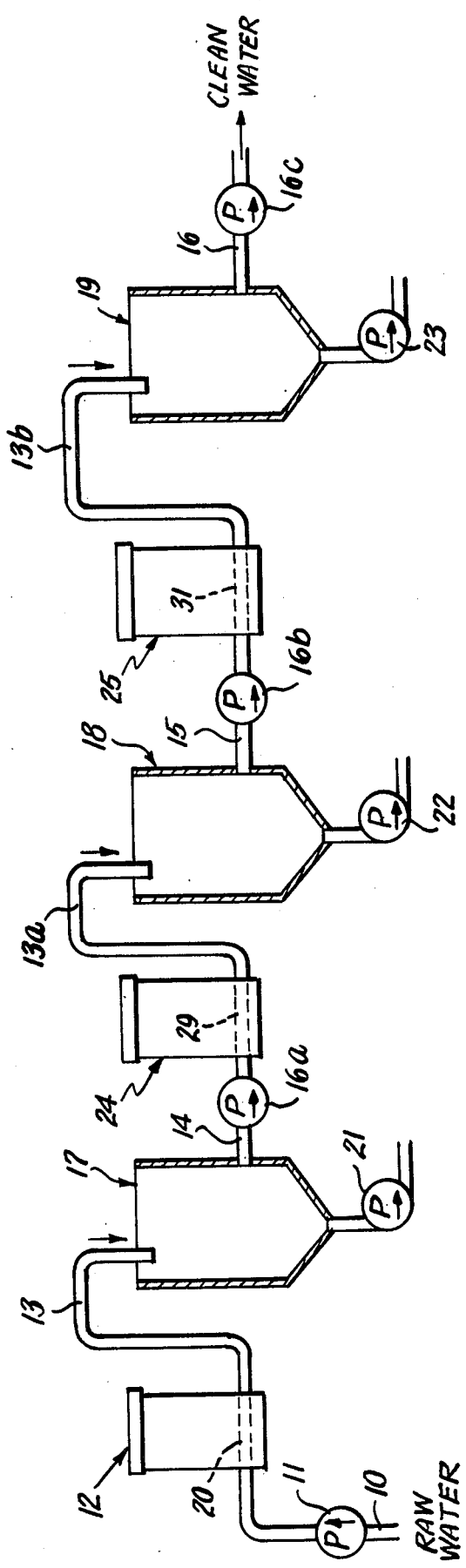
FIG. 1 is a diagrammatic view of a preferred physical embodiment of this invention.

As can be seen in FIG. 1, the raw or untreated water containing high mineral content, such as iron oxides, which are in the form of finely divided solids suspended or dispersed in water is initially pumped through an inlet conduit 10 by circulating pump 11. As is well known, the separation of solids from liquid may be greatly facilitated by first pre-treating the mixture. In fact, economic separation or purification on a large or industrial scale is virtually impossible unless a suitable treatment method is employed. The present invention employs an electromagnetic unit 12 as shown diagrammatically in FIG. 1 and in detail in FIG. 3 containing a helical band 130 and in FIG. 4 containing a helical screw impeller 130 such as described and claimed in applicant's copending application entitled UNITARY PACKAGE FOR WATER TREATMENT FOR ATTACHMENT TO HOME HOT WATER HEATER Ser. No. 855,951, filed Nov. 30, 1977, which is incorporated herein by reference thereto.

Figure 2:
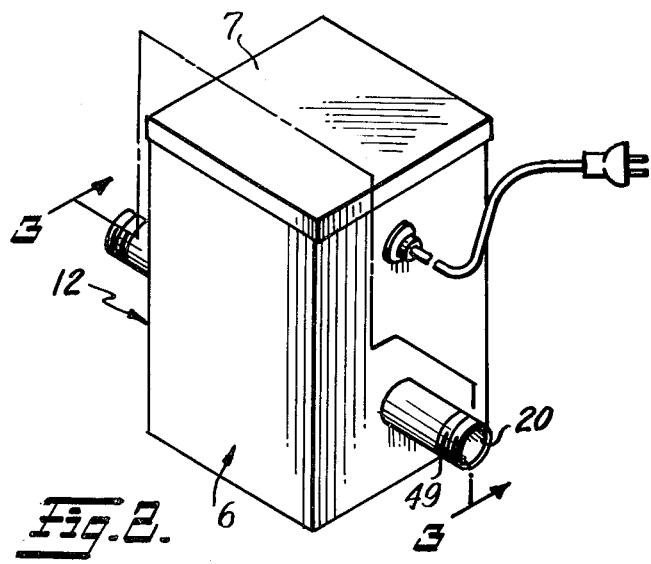
FIG. 2 is an enlarged view of the electromagnet unit for water treatment as illustrated diagrammatically in FIG. 1.

Two different types of helical screw are shown in my prior copending application, Ser. No. 855,951 filed Nov. 30, 1977, each having 2½ turns, one being in the form of a band as shown in FIG. 2 and the other being in the form of a screw as shown in FIG. 5.

Figure 3:
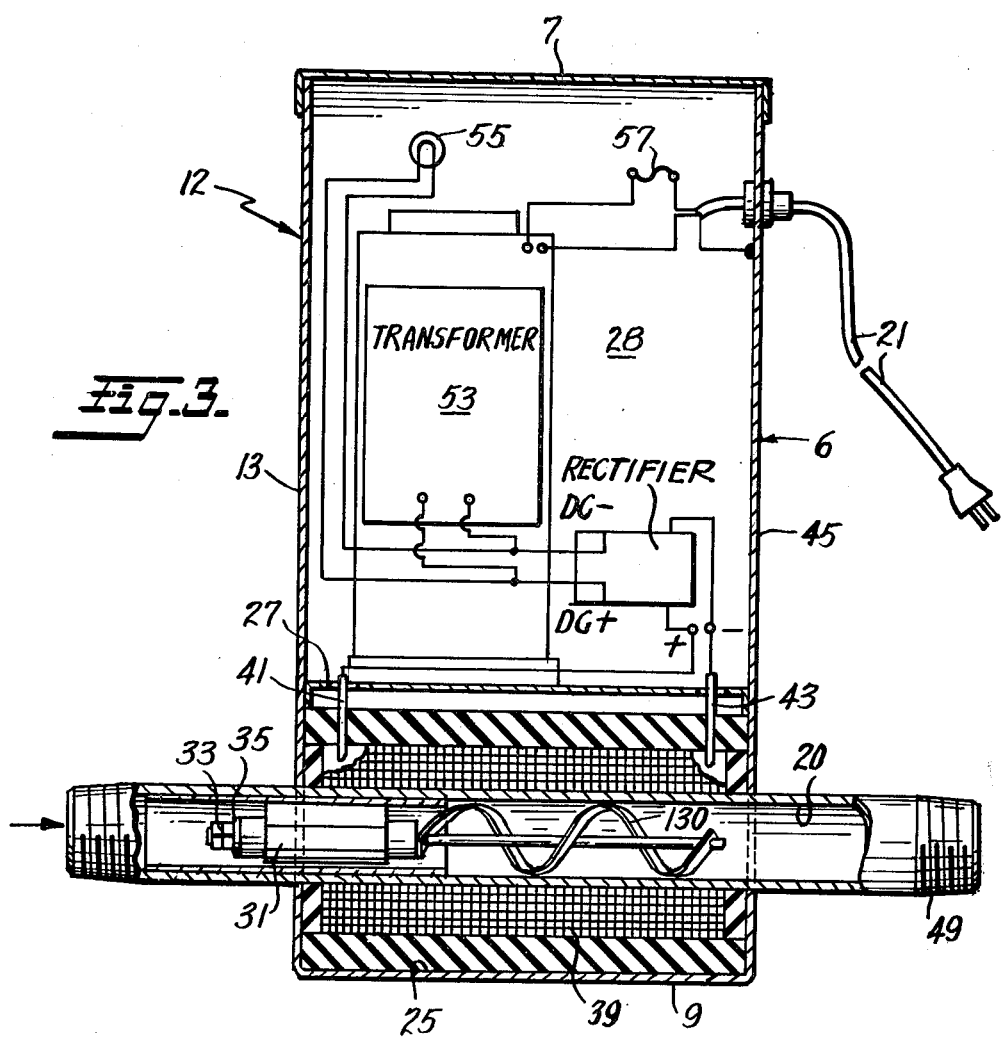
FIG. 3 is a view in cross-section on line 3—3 of FIG. 2 showing the details of the electromagnet unit.

In FIG. 3 of the present application the upper compartment 23 takes up about two-thirds of the unitary package and the lower compartment 25 the remaining one-third, thereby adapting the unitary package 5 for connection to a very low city water inlet and low boiler inlet connection.

As shown in FIG. 5 of Ser. No. 855,951, the upper compartment takes up one-third of the unitary package and the lower compartment the remaining two-thirds which is generally the more preferred embodiment.

In the physical embodiment disclosed in FIG. 3 herein, the water conditioner unitary package 12 comprises box 6, top wall 7, bottom wall 9, side walls 13 and 45, partition 27, coupling pipe 20 with thread 49, electrical conductor 21 connecting the step down transformer 53 located in upper compartment 28 and electromagnetic winding 39 and leads 41 and 43 housed in lower compartment 25. A pilot light 55 and fuse 57 are located in the upper part of box 6. The major part of the length within conduit 20 in the package is swept by placing an apertured spider at the feed water inlet so that a helical impeller 130 extends through a major portion of the conduit 20. The impeller assembly comprises a lock nut 33, washer 35, elongated graphite bearing 31 which provide the fixed seat for the solid helical screw impeller 130 and its shaft which rotates in graphite bearing 31. The solid helical screw impeller is made of ferromagnetic material and has a very close tolerance (about 1/16 inch) with the wall of inlet pipe 20 thereby sweeping the inner wall free from particles which tend to deposit on the wall, thus providing a positive sweeping action. The induced magnetic field impressed by the winding 39 fed with 24 Volt DC effectively suspends the particles which repsond to the magnetic fields and to the rotational sweeping action of the helical impeller 130.

The electromagnetic coil 39 is insulated and thermally and electrically encapsulated with a rigid coated resin of ⅛ to ¼ inch thickness of styrene polyester, reinforced with chopped fiberglass ranging in size from ⅛ to 1/32 inch long. It has been discovered that for optimum performance an electromagnetic winding having a 15 Ampere rating of 1000 turns of aluminum magnet wire and operating on 4 Amperes 24 volt DC will provide most effective electromagnetic water treatment for a one inch diameter pipe. For a 1½ inch diameter pipe, an electromagnetic winding of aluminum magnet wire having a 20 Ampere rating and 1400 turns of wire uses 5 Amperes and provides satisfactory service. For a 2 inch diameter pipe, an electromagnetic winding of 50 Ampere rating and 1050 turns of aluminum magnet wire uses 10 Amperes with very successful results.

Figure 4:
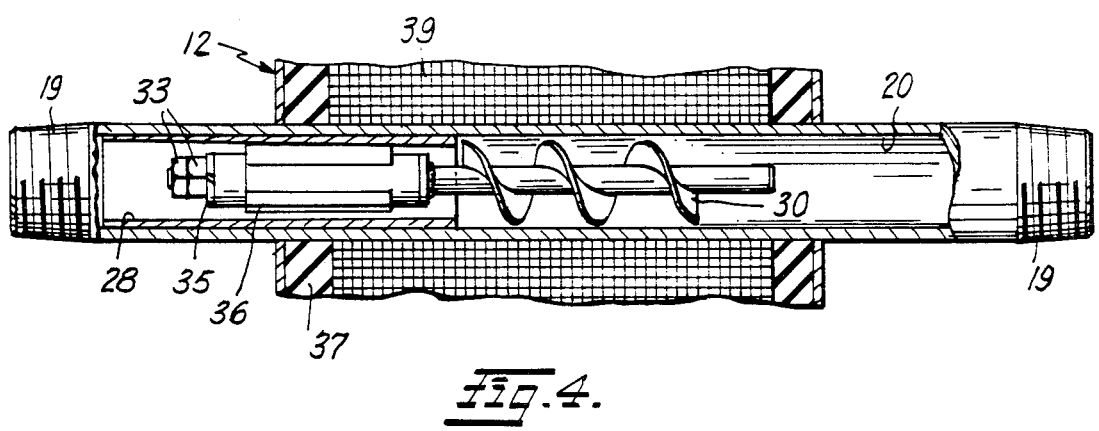
FIG. 4 is an enlarged fragmentary vertical sectional view, similar to FIG. 3 but showing a modification of the impeller.

The modification of impeller shown in FIG. 4 is preferred, namely a solid helical screw impeller 30 with 2 to 3 flights.

This pre-treatment apparatus discloses a helical screw impeller 30 made of ferromagnetic material which has very close tolerance with the wall conduit 20, thereby providing a positive sweeping action. An induced magnetic field impressed by winding 39 within the area of the impeller effectively suspends the particles which respond to the magnetic field and to the rotational sweeping action of the helical impeller 130.

As shown in FIG. 1, the water flowing through the electromagnetic unit 12 and conduit 13 is subjected to a further separation of the mineral content by using a plurality of gravity separators or tanks 17, 18 and 19 which are flow connected in series. The flow of the processed water is effected in a straight continuous line, wherein the flow-lines 14, 15 and 16, respectively, are connected at about the mid-level of each tank at 17, 18 and 19, thereby providing a drain-off for the supernatant liquid in each tank. The mineral content of the water in each tank tends to settle by gravity toward the bottom and is extracted at the bottom of each tank by extractor pumps 21, 22 and 23.

As can be seen from a consideration of FIG. 1, the processed water prior to entering each tank in the purification process is treated by a similar electromagnetic unit at 24 and 25 in the same manner. Each of the electromagnet units 24 and 25 is connected by conduits 13a and 13b which lead to the top of the respective separator tanks 18 and 19.

The supernatant liquid from tanks 17 and 18 is fed through conduits 29 and 31 and extend through electromagnet units 24 and 25, respectively, for treatment thereof prior to entering the settling tanks 18 and 19. Conventional circulating pumps 16a and 16b facilitate feeding the liquid through the electromagnet units. In the final stage, clean water is tapped off conduit 16 from separating tank 19 and pumped by circulating pump 16c to its point of delivery.

The apparatus of this invention provides advantages in that a minimal number of moving parts is employed. Further, ample storage space is provided allowing operators sufficient time to effect separations, make inspections and apply such treatments as needed to purify the end product, clean water. Further, the apparatus of this invention provides a plurality of separator tanks or containers, each of which can be activated or not as desired, to withdraw processed or clean water. For example, the first stage separator tank may contain between 20,000 to 30,000 parts per million impurities and the processed clean water is stepped down to 500 to 800 parts per million impurities. Obviously, any suitable number of staging separator tanks may be used depending upon the condition of the raw water and the degree of purity desired. Still further, maintenance overhead is dramatically reduced. There are savings on boiler compounds or chemical treatment and substantial reductions of fuel costs.

In a further application of this invention the apparatus can be used for sewage treatment if colloidal micron-sized paramagnetic material such as iron oxide particles can be added to activated sludge flocs. By magnetic filtration, the sludge can be separated very rapidly which would reduce the size of the settling units. Thus, the process and apparatus, according to this invention, can be widely used for treating brackish water or various waste water.

The practical benefits of this invention are substantial and may result in substantial increases in sedimentation rate, subsidence rate, and filtration rate.

While the invention has been disclosed herein in connection with a preferred embodiment and certain structural and procedural details, it is clear to one skilled in the art that changes, modifications or equivalents can be used. Accordingly, such changes within the principles of the invention are intended to be included within the scope of claims below.

Having thus disclosed the invention, I claim:

1. In an apparatus for separating finely divided solid particles suspended in water, the combination of:
    a plurality of fluidly interconnected settlement tanks each having an inlet for raw water and an outlet for treated water, each tank having a conical bottom and an extractor means adjacent the conical bottom of said tank for withdrawing gravity settled material therefrom and leaving a supernatant liquid in a supernatant zone above a bottom settlement zone;
    a circulating pump, including conduit means fluidly connected to a filter pre-treating unit for passing raw water therethrough;
    a filter pre-treating unit fluidly connected to the inlet of each tank comprising a pre-treatment conduit, an electromagnetic aluminum wire winding fed by $24 \pm 4$ volts DC surrounding said conduit and extending therethrough, a step-down transformer for 110 to 220 volts, a DC rectifier and a casing for the conduit and unit;
    said conduit containing a helical screw impeller rotatably mounted therein which has about $2\frac{1}{2}$ turns spaced at about 1/16 inch from the inner wall of said conduit which rotates responsive to water flow in said conduit; and
    said helical screw impeller having its first turn starting close to the inner wall of said conduit and inducing therein a magnetic field by its rotation under the influence of said electromagnetic winding surrounding said conduit for inducing a magnetic field providing a positive sweeping action to the suspended particles in the supernatant liquid above the bottom settlement zone of each tank.

2. The apparatus as set forth in claim 1 wherein each tank is provided at the outlet thereof with a pump, said outlet being at mid-level of said tank for withdrawing the treated water from the supernatant zone.

* * * * *